(12) United States Patent
Shiizaki

(10) Patent No.: US 8,509,289 B2
(45) Date of Patent: Aug. 13, 2013

(54) RELAY DEVICE AND WIRELESS RELAY METHOD

(75) Inventor: Kotaro Shiizaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 319 days.

(21) Appl. No.: 12/968,516

(22) Filed: Dec. 15, 2010

(65) Prior Publication Data

US 2011/0158295 A1 Jun. 30, 2011

(30) Foreign Application Priority Data

Dec. 28, 2009 (JP) ................................ 2009-297833

(51) Int. Cl.
*H04L 25/20* (2006.01)

(52) U.S. Cl.
USPC ............................ 375/211; 455/18; 340/425.1

(58) Field of Classification Search
USPC .................... 375/211; 455/7, 18; 340/425.1; 714/748, 750; 370/315, 492, 501
See application file for complete search history.

(56) References Cited

U.S. PATENT DOCUMENTS

| | | | |
|---|---|---|---|
| 6,335,923 B2 | 1/2002 | Kubo et al. | |
| 2009/0017814 A1 | 1/2009 | Horiuchi et al. | |
| 2009/0227201 A1 | 9/2009 | Imai et al. | |
| 2010/0035541 A1* | 2/2010 | Kim et al. | 455/9 |
| 2010/0054270 A1* | 3/2010 | Shinozaki | 370/413 |
| 2011/0053630 A1 | 3/2011 | Higuchi | |
| 2011/0080865 A1* | 4/2011 | Tsai et al. | 370/315 |

FOREIGN PATENT DOCUMENTS

| | | |
|---|---|---|
| JP | 59-44142 | 3/1984 |
| JP | 10-79701 | 3/1998 |
| JP | 2003-319458 | 11/2003 |
| JP | 2005-45568 | 2/2005 |
| WO | 2006/090669 | 8/2006 |
| WO | 2006/098273 | 9/2006 |
| WO | 2009/119051 | 10/2009 |

* cited by examiner

*Primary Examiner* — Betsy Deppe
(74) *Attorney, Agent, or Firm* — Katten Muchin Rosenman LLP

(57) ABSTRACT

A relay device for relaying wireless communication between a transmission device and a reception device includes a buffer configured to temporarily store first data that is a relay object so that the first data is retransmitted to the reception device, a buffer control unit configured to restrict the first data from being stored in the buffer when, based on information acquired using a signal fed back from the reception device, it is determined that a chance of retransmitting the first data is low, and a retransmission request unit configured to request the transmission device to retransmit the first data when the first data is not stored in the buffer and the first data is to be retransmitted to the reception device.

5 Claims, 10 Drawing Sheets

RELAY DEVICE AND WIRELESS RELAY METHOD

CROSS-REFERENCE TO RELATED APPLICATIONS

This application is based upon and claims the benefit of priority of the prior Japanese Patent Application No. 2009-297833, filed on Dec. 28, 2009, the entire contents of which are incorporated herein by reference.

FIELD

The invention relates to a relay technique for relaying wireless communication between a transmission device and a reception device, for example, relaying wireless communication between a base station and a mobile station, or the like.

BACKGROUND

In a next-generation wireless relay system for which high-speed transmission of 100 Mbps to 1 Gbps is required, it is assumed that high frequency bands are allocated. However, typically, compared with a low-frequency band signal, a high-frequency band signal has a strong rectilinear propagation characteristic but it is noted that many dead spots occur where radio wave is hard to reach. Therefore, if it is assumed that the transmission power of a base station is the same as that of a wireless relay system currently commercialized, the coverage (service area) of a cell decreases owing to the allocation of a high-frequency band. This situation is not desirable, both with respect to increasing costs due to increase in the number of base stations and the occurrence of frequent handover.

Consequently, a wireless relay system that includes a relay station (relay device) for relaying wireless communication between a base station and a mobile station has been proposed. Typically, since the relay station is available at lower cost than the base station, a whole system may be realized at low cost while a sufficient coverage is secured by introducing the relay station.

As a relay station, a so-called amplify and forward (AF) type and a so-called decode and forward (DF) type have been known. For example, the AF-type relay station amplifies, without modification, a reception signal from a base station and transmits the reception signal to a mobile station. For example, after the DF-type relay station demodulates and decodes a reception signal from a base station once, the DF-type relay station encodes and modulates the signal, converts the signal into a frame format, and amplifies and transmits the signal to a mobile station. According to the DF type relay station, compared with the AF-type relay station, in a reception device (base station or mobile station) that is a relay destination, a favorable reception error rate characteristic may be obtained.

In order to allow data to be retransmitted from the relay station to the communication device (reception device) that is a relay destination, the relay station stores data, transmitted by the relay station, in a retransmission buffer until, for example, the relay station receives a signal (ACK) that indicates reception completion from the reception device. When a signal (NACK/DTX) that indicates reception noncompletion is fed back from the reception device, the relay station retransmits the data to the reception device. Therefore, for example, if it is assumed that wireless communication is relayed from the base station to the mobile station, the relay station stores a large amount of transmission data in the retransmission buffer in a case in which the number of mobile stations (reception devices) that are relay destinations are large. Therefore, buffer overflow may occur in the retransmission buffer.

Regarding a control operation for a buffer memory that corresponds to the retransmission buffer, a technique has been known in which data in the buffer memory and data transmission are controlled in response to the usage state of the buffer memory (for example, refer to Japanese Laid-open Patent Publication No. 2003-319458). In the technique, when a data accumulation amount in a buffer memory in a wireless base station is more than or equal to a predetermined level, a communication control device controls the buffer memory so as to release (discard) data in the buffer memory in the wireless base station. In addition, in the technique, when the usage state of the buffer memory is comparatively inactive, the communication control station performs a control operation for restricting a transmission amount of downlink data to the wireless base station.

By the way, in accordance with the spread of relay stations from now, it is requested that the capacity of the retransmission buffer be reduced so as to downsize the relay station. However, in the technique of the related art described above, a control operation is simply performed based on whether or not the data accumulation amount in the buffer memory is more than or equal to the predetermined level, and it is not intended that the capacity of buffer itself is reduced.

SUMMARY

According to an aspect of the invention, a relay device for relaying wireless communication between a transmission device and a reception device includes a buffer configured to temporarily store first data that is a relay object so that the first data is retransmitted to the reception device, a buffer control unit configured to restrict the first data from being stored in the buffer when, based on information acquired using a signal fed back from the reception device, it is determined that a chance of retransmitting the first data is low, and a retransmission request unit configured to request the transmission device to retransmit the first data when the first data is not stored in the buffer and the first data is to be retransmitted to the reception device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS (1) First Embodiment

A wireless relay system according to a first embodiment will be described, hereinafter.

Figure 1:
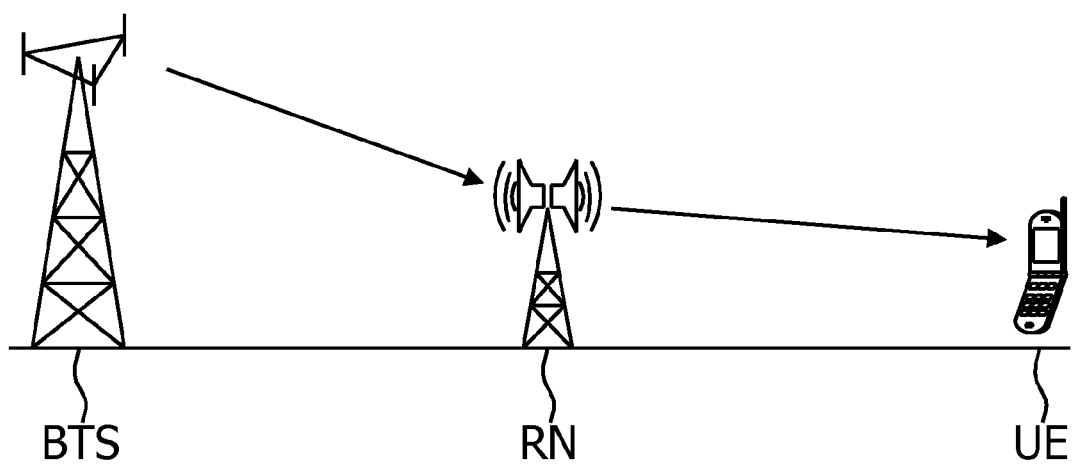
FIG. 1 illustrates an example of a wireless relay system according to a first embodiment.

As illustrated in FIG. 1, the wireless relay system according to the embodiment includes a base station (base transceiver station: BTS), a relay station (relay node: RN), and a mobile station (user equipment: UE). The relay station relays wireless communication between the base station and the mobile station. In addition, in the embodiment, a case in which a downlink wireless signal is relayed will be described as an example. Namely, the base station corresponds to a transmission device, and the mobile station corresponds to a reception device. The relay station corresponds to a relay device.

In the wireless relay system, in case that, for example, data that is a relay object is not received at the mobile station owing to an unfavorable propagation channel environment between the relay station and the mobile station, the relay station includes a retransmission buffer (not illustrated) used for temporarily holding transmission data to be transmitted to the mobile station. In addition, as information (referred to as "reference information", hereinafter) obtained based on a signal (referred to as "feedback signal", hereinafter) fed back from the mobile station that is a relay destination, the relay station obtains a variety of information including information that indicates wireless quality between the relay station and the mobile station. The reference information is not limited to the wireless quality between the relay station and the mobile station, and any information that becomes an index used for determining the probability of retransmitting data from the relay station to the mobile station may be used as the reference information. In addition to the wireless quality, examples of the reference information include information that indicates a distance between the relay station and the mobile station, information that indicates a frequency of a data retransmission request from the mobile station, and the like. In addition, the relay station acquires a feedback signal from each mobile station that is a relay destination.

When, by referring to the reference information obtained before data transmission, it is determined that a chance of retransmitting data is low, the relay station in the embodiment stops the transmission data from being stored in the retransmission buffer. Accordingly, the capacity of the buffer may be suppressed. Contrary to the determination result of the chance of data retransmission performed in the relay station, when data is retransmitted, data is retransmitted from the base station that is the transmission source of the data.

Figure 2:
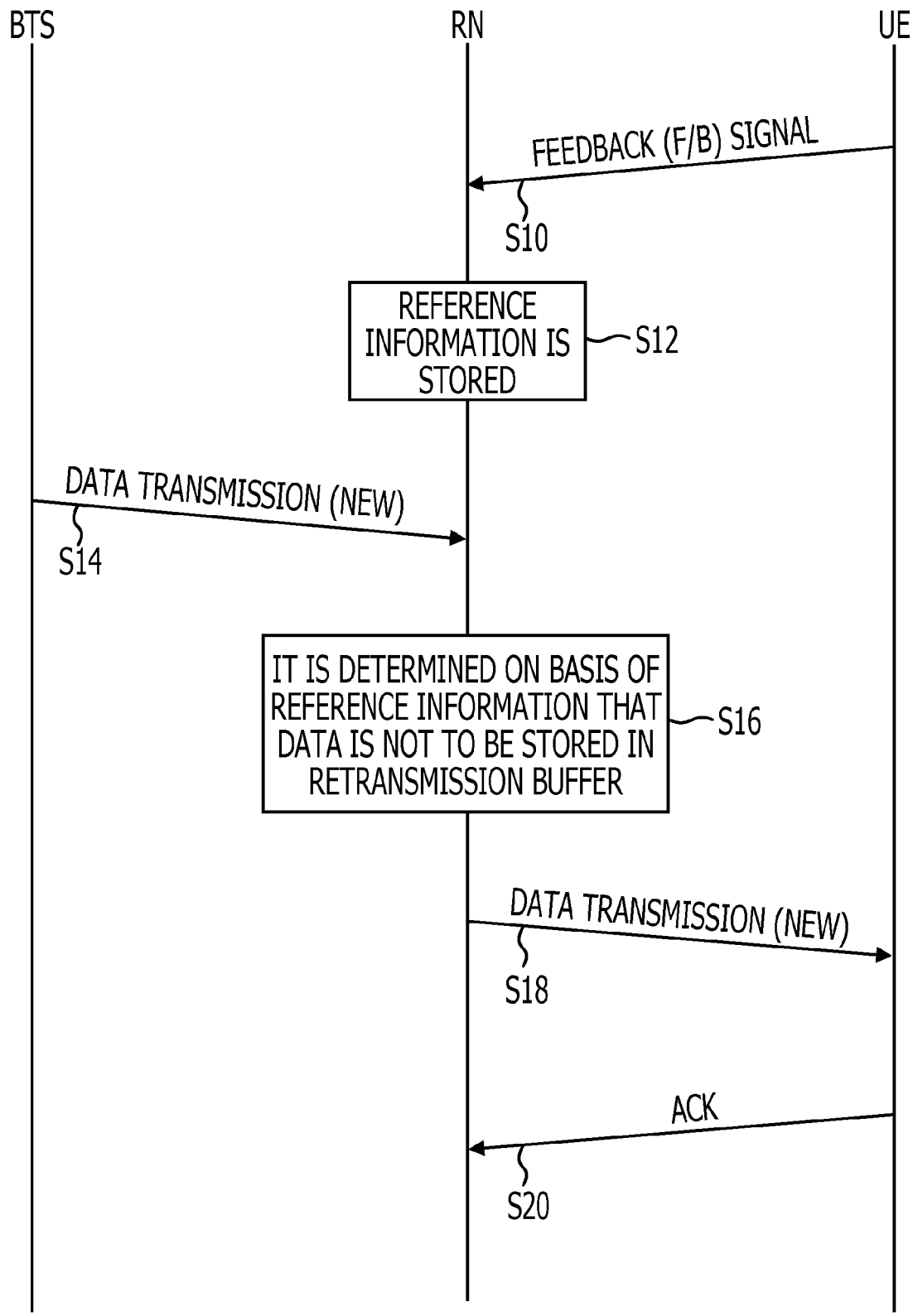
FIG. 2 illustrates a flow of a wireless relay method performed when data is not retransmitted from a relay station in the first embodiment.
Figure 3:
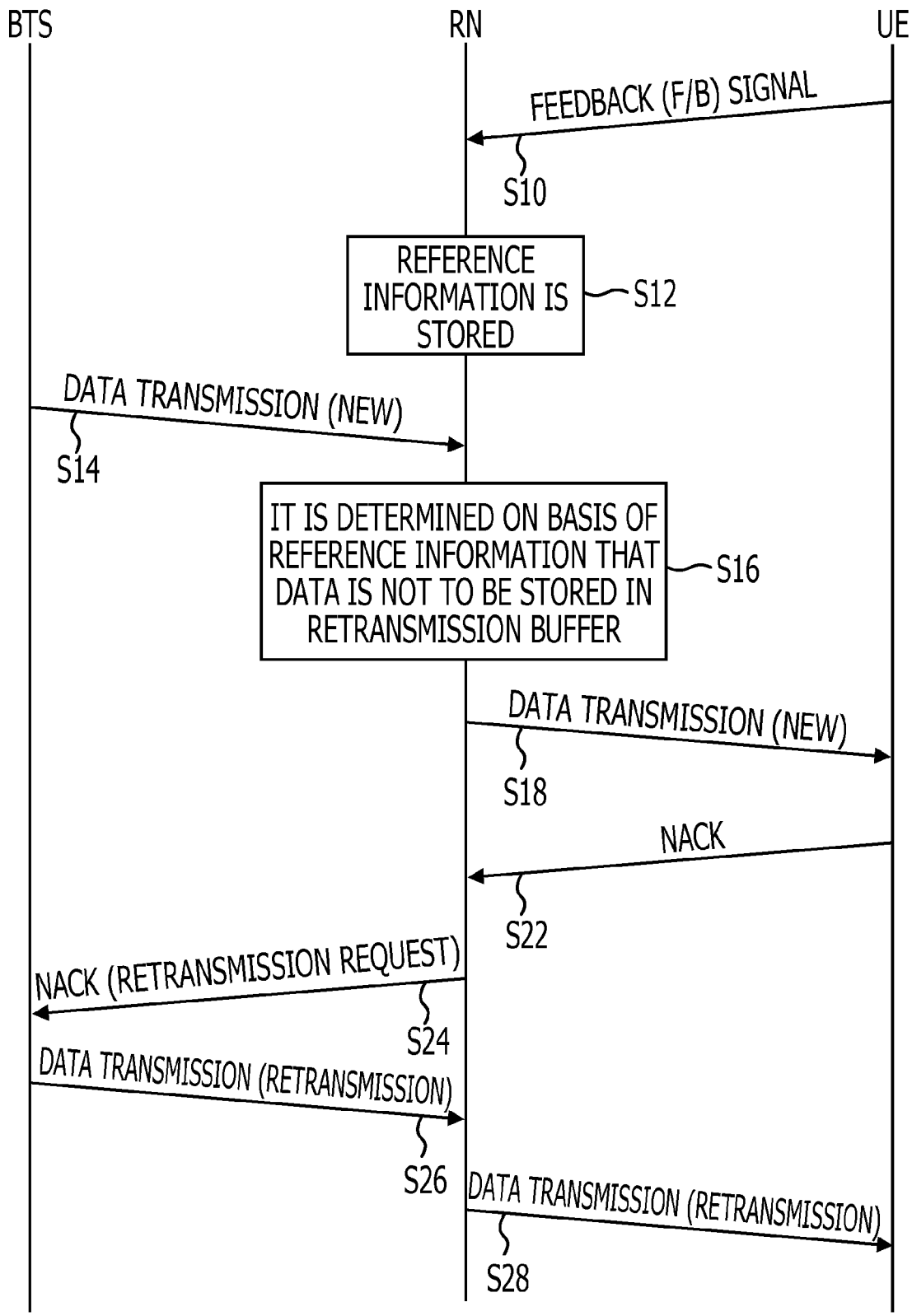
FIG. 3 illustrates a flow of a wireless relay method performed when data is retransmitted from the relay station in the first embodiment.

A wireless relay method according to the embodiment will be described with reference to FIGS. 2 and 3. FIG. 2 is a flowchart illustrating a wireless relay method performed when data is not retransmitted from the relay station. FIG. 3 is a flowchart illustrating a wireless relay method performed when data is retransmitted from the relay station. In addition, FIGS. 2 and 3 share Steps S10 to S18.

First, referring to FIG. 2, before data transmission, the relay station obtains a feedback (F/B) signal from the mobile station (Step S10). The feedback signal is, for example, a signal that indicates the wireless quality between the relay station and the mobile station, and is, for example, a channel quality indicator (CQI) described later or the like. The relay station stores information (for example, a value of the CQI) obtained based on the feedback signal, as the reference information (Step S12). Next, data that is a relay object is newly transmitted from the base station (Step S14).

In the relay station, in relaying data to the mobile station, it is determined based on the reference information of the mobile station whether or not the chance of retransmitting the data to the mobile station is high. For example, when, by referring the reference information, it turns out that the wireless quality between the relay station and the mobile station is favorable, it is assumed that wireless relay to the mobile station has a high success probability, and hence it is determined that the chance of retransmitting the data to the mobile station is low. Namely, the relay station determines that data is not to be stored in the retransmission buffer (Step S16). Accordingly, data accumulation in the retransmission buffer is suppressed.

After that, the relay station transmits new data that is a relay object to the mobile station (Step S18). When the data is correctly received, the mobile station transmits an "ACK" as a retransmission control signal to the relay station (Step S20).

Next, in place of Step S20 in FIG. 2, FIG. 3 illustrates a case in which the mobile station does not correctly receive the data. Namely, in Step S22 in FIG. 3, the mobile station transmits a "NACK" as a retransmission control signal to the relay station. In Step S16, the relay station just determines the chance of data retransmission based on the reference information. Therefore, even if the relay station determines that the chance of data retransmission is low, it may also be assumed that data is retransmitted actually. In this case, since the relay station does not store transmission data in the relay station itself, the relay station requests the base station that is a transmission source to transmit data again. Namely, upon receiving the "NACK" from the mobile station, the relay station transmits a "NACK" that is a data retransmission request to the base station that is a transmission source of data (Step S24). Upon receiving the "NACK" from the relay station, the base station retransmits data to the relay station (Step S26). The relay station retransmits data to the mobile station based on data retransmitted from the base station (Step S28).

As described above, in the wireless relay system according to the embodiment, when the chance of retransmitting data is low, the data is stopped from being stored in the retransmission buffer in the relay station. Accordingly, when wireless communication is relayed from the base station (transmission device) to the mobile station (reception device), the capacity of the retransmission buffer may be reduced, the retransmission buffer being used in order for the relay station to temporarily store data that is a relay object so that the relay station retransmits the data. Accordingly, the whole relay station may be downsized, and an access time for the retransmission buffer becomes shortened, thereby contributing to the reduction of a time necessary for communication from the relay station to the mobile station (reception device). In addition, when a chance that the relay station retransmits data is high, the data is held in the retransmission buffer in the relay station. Therefore, compared with a case in which all data is retransmitted from the base station regardless of the chance of data retransmission, a communication time necessary for retransmission data may be reduced.

(2) Second Embodiment

A wireless relay system according to a second embodiment will be described, hereinafter. In the embodiment, examples of specific configurations of a relay station and a mobile station will be described. In addition, while, in Long Term Evolution (LTE) or the like, an OFDM method is applied to a downlink signal, a processing operation based on the OFDM method will be arbitrarily referred to in descriptions of the following individual configurations.

(2-1) Examples of Configurations of Relay Station and Mobile Station

Figure 4:
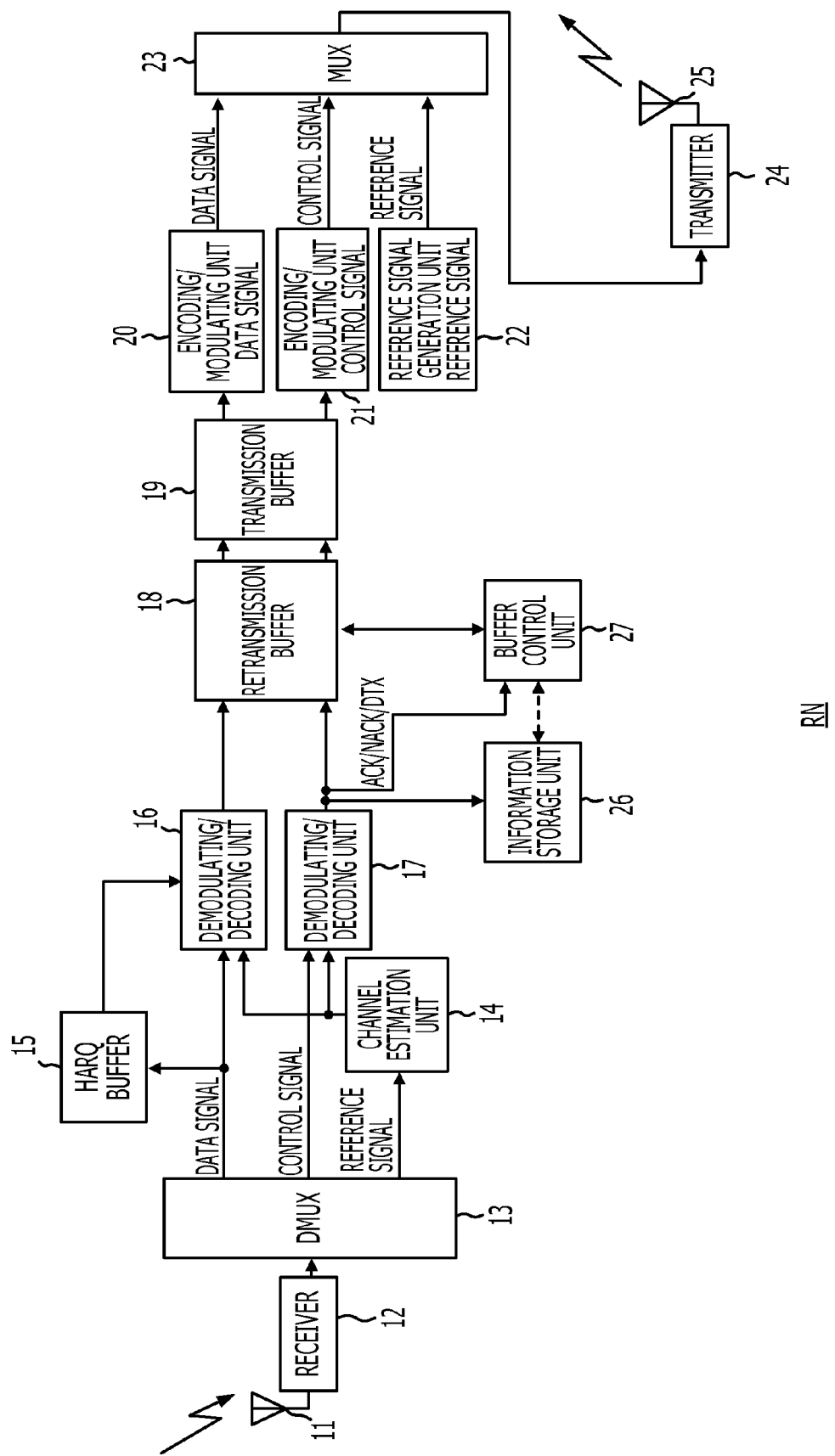
FIG. 4 is a block diagram illustrating an example of an internal configuration of a relay station (RN) in a second embodiment.
Figure 5:
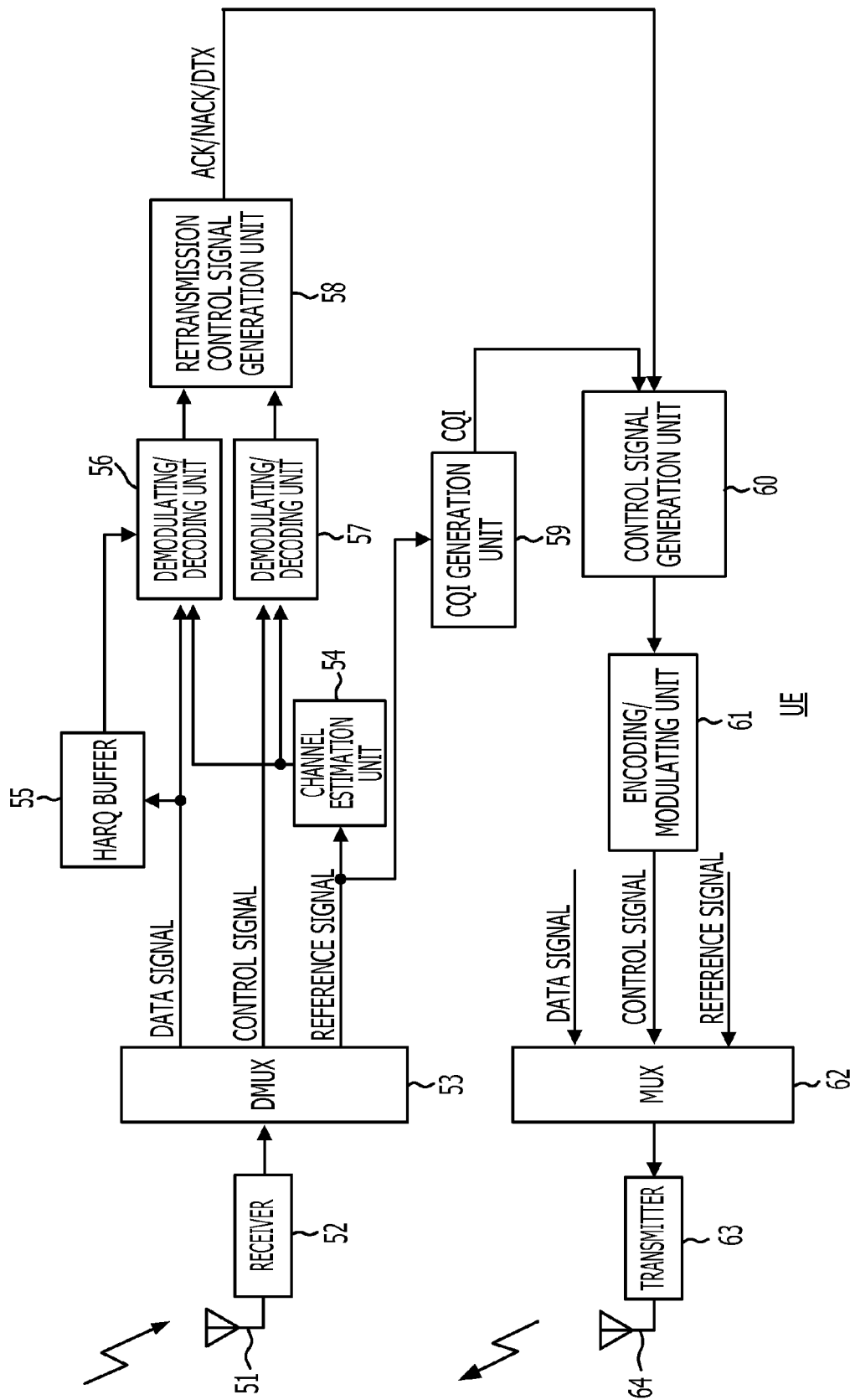
FIG. 5 is a block diagram illustrating an example of an internal configuration of a mobile station (UE) in the second embodiment.

The configurations of the relay station and the mobile station in the wireless relay system according to the embodiment will be individually described with reference to FIGS. 4 and 5, hereinafter. FIG. 4 is a block diagram illustrating an example of an internal configuration of a relay station (RN). FIG. 5 is a block diagram illustrating an example of an internal configuration of a mobile station (UE).

Configuration of Relay Station

As illustrated in FIG. 4, the relay station (RN) includes a reception antenna 11, a receiver 12, a de-multiplexing unit (DMUX) 13, a channel estimation unit 14, an HARQ buffer 15, a demodulating/decoding unit 16, a demodulating/decoding unit 17, a retransmission buffer 18, a transmission buffer 19, an encoding/modulating unit 20, an encoding/modulating unit 21, a reference signal generation unit 22, a multiplexing unit (MUX) 23, a transmitter 24, a transmission antenna 25, an information storage unit 26, and a buffer control unit 27.

The receiver 12 converts an RF signal received by the reception antenna 11 into a digital baseband signal. The receiver 12 includes a band-limiting filter, a low noise amplifier (LNA), a local frequency generator, an orthogonal demodulator, an automatic gain control (AGC) amplifier, and an analog to digital (A/D) converter.

The de-multiplexing unit 13 separates a reception signal (baseband signal) into a data signal, a control signal, and a reference signal. Examples of the reference signal include a known pilot symbol and a known preamble and the like. When an orthogonal frequency division multiplexing (OFDM) communication method is adopted, after removing a guard interval (GI), the de-multiplexing unit 13 generates encoded symbol sequence of individual subcarriers by performing a fast Fourier transform (FFT) processing operation in which a predetermined FFT window is set. In addition, the de-multiplexing unit 13 performs a processing operation in which the data signal, the control signal, and the reference signal, inserted into predetermined subcarriers, are separated.

The channel estimation unit 14 performs a channel estimation processing operation based on the separated reference signal and a reference signal known in the relay station. By calculating a correlation value between the received reference signal and the known reference signal in the channel estimation processing operation, the channel estimation unit 14 calculates channel status information (CSI) that relates to a link from the base station to the relay station. The channel estimation unit 14 sends the CSI to the demodulating/decoding units 16 and 17.

The demodulating/decoding units 16 and 17 perform demodulating/decoding processing operations for the data signal and the control signal, respectively. In the demodulating/decoding processing operations, using the CSI calculated by the channel estimation unit 14, the demodulating/decoding units 16 and 17 perform channel compensation for the data signals and the control signals, respectively. For example, when the OFDM communication method is adopted, the demodulating/decoding units 16 and 17 perform channel compensation for individual subcarriers and individual OFDM symbols, and compensates phase rotation or the like that may occur in a propagation channel.

The HARQ buffer 15 is a buffer provided for executing a hybrid auto repeat request (HARQ) at the time of retransmission. In the HARQ, the relay station transmits to a reception device (the mobile station in the embodiment) data blocks the information bits of which are error-correction-coded. In addition, when the mobile station does not correctly receive the data blocks, the relay station transmits to the mobile station other data blocks created based on the same information bits. The mobile station reproduces original information bits based on the plurality of data blocks. Accordingly, the encoding ratio of data blocks that are decoding objects at the mobile station is reduced, and error correction capability in decoding is improved. The data signal obtained in the de-multiplexing unit 13 is once stored in the HARQ buffer 15, and is supplied to the demodulating/decoding unit 16 when the HARQ is executed. In addition, the execution of the HARQ is an example in the embodiment.

In case that the data signal and the control signal, demodulated and decoded, are retransmitted, the data signal and the control signal are once stored in the retransmission buffer 18. When the data signal and the control signal are newly transmitted, whether or not the data signal and the control signal are stored in the retransmission buffer 18 is controlled by the buffer control unit 27, as described later. When the data signal and the control signal are stored in the retransmission buffer 18, the same (or duplicated) data signal and the same (or duplicated) control signal are sent to the transmission buffer 19 with the data signal and the control signal being stored in the retransmission buffer 18. The encoding/modulating units 20 and 21 perform encoding/modulating processing operations on the data signal and the control signal that are transmission objects, respectively.

The multiplexing unit 23 multiplexes the data signal and the control signal, which are subjected to the encoding/modulating processing operations, and the reference signal generated in the reference signal generation unit 22, and hence generates a baseband signal to be transmitted. For example, when the OFDM communication method is adopted, the multiplexing unit 23 performs GI addition and the conversion of individual subcarriers into time domain signals using an inverse fast Fourier transform (IFFT) processing operation. The transmitter 24 includes a digital to analog (D/A) converter, a local frequency generator, a mixer, a power amplifier, a filter, and the like. After the transmitter 24 up-converts the baseband signal from the multiplexing unit 23 from a baseband frequency into a wireless frequency, the transmitter 24 transmits a signal that has the wireless frequency from the transmission antenna 25.

The information storage unit 26 stores the reference information obtained based on the feedback signal from the mobile station (reception device). A case in which the information storage unit 26 stores, as the reference information, the channel quality indicator (CQI) that indicates wireless quality of a downlink from the relay station to the mobile station will be described hereinafter. The information storage unit 26 manages the CQI for each mobile station that is a relay object. Each time the CQI is sequentially fed back from each mobile station, the information storage unit 26 updates the reference information. The CQI from each mobile station is included in an uplink control signal from each mobile station to the relay station.

The buffer control unit 27 controls the retransmission buffer 18 based on the retransmission control signal (ACK/NACK/DTX) included in the control signal from the mobile station. The buffer control unit 27 refers to the reference information stored in the information storage unit 26, and, with respect to each mobile station that is a relay object, controls whether or not data and a control signal that are transmission objects are to be stored in the retransmission buffer 18. The operation of the buffer control unit 27 will be described later.

Configuration of Mobile Station

As illustrated in FIG. 5, the mobile station (UE) includes a reception antenna 51, a receiver 52, a de-multiplexing unit (DMUX) 53, a channel estimation unit 54, a HARQ buffer 55, a demodulating/decoding unit 56, a demodulating/decoding unit 57, a retransmission control signal generation unit 58, a CQI generation unit 59, a control signal generation unit 60, an encoding/modulating unit 61, a multiplexing unit (MUX) 62, a transmitter 63, and a transmission antenna 64.

The receiver 52 converts an RF signal received by the reception antenna 51 into a digital baseband signal. The receiver 52 includes a band-limiting filter, a low noise amplifier (LNA), a local frequency generator, an orthogonal demodulator, an AGC amplifier, and an A/D converter or the like. The de-multiplexing unit 53 separates a reception signal (baseband signal) into a data signal, a control signal, and a reference signal. Examples of the reference signal include a known pilot symbol and a known preamble and the like.

The channel estimation unit 54 performs a channel estimation processing operation based on the separated reference signal and a reference signal known in the mobile station. By calculating a correlation value between the received reference signal and the known reference signal in the channel estimation processing operation, the channel estimation unit 54 calculates channel status information (CSI) that relates to a link from the relay station to the mobile station. The channel estimation unit 54 sends the CSI to the demodulating/decoding units 56 and 57.

The demodulating/decoding units 56 and 57 perform demodulating/decoding processing operations for the data signal and the control signal, respectively. In the demodulating/decoding processing operations, the demodulating/decoding units 56 and 57 perform channel compensation for the data signals and the control signals using the CSI calculated by the channel estimation unit 54. The HARQ buffer 55 is provided for executing a hybrid auto repeat request (HARQ) at the time of retransmission. In addition, the execution of the HARQ is an example in the embodiment.

Based on the decoding result of the data signal and the control signal, the retransmission control signal generation unit 58 determines whether or not data has been correctly received. In addition, the retransmission control signal generation unit 58 generates a retransmission control signal in accordance with the determination result, and supplies the retransmission control signal to the control signal generation unit 60. The retransmission control signal includes, for example, an "ACK", a "NACK", or a "DTX". The "ACK" indicates that data has been correctly received. The "NACK" indicates that data has not been correctly received. The "DTX" indicates that reception data has not been obtained (namely, no transmission).

The CQI generation unit 59 generates a channel quality indicator (CQI) that corresponds to the reception quality of a downlink signal, based on the reference signal (pilot symbol, preamble, or the like) obtained from the de-multiplexing unit 53. Here, in order to obtain the CQI, for example, a signal to noise ratio (SNR), a carrier to interferer plus noise ratio (CINR), a received signal strength indicator (RSSI), or the like is measured. The CQI generation unit 59 supplies the obtained CQI to the control signal generation unit 60. The CQI is an example of a feedback signal transmitted to the relay station so that the relay station obtains the reference information.

The control signal generation unit 60 generates a control signal that includes the retransmission control signal (ACK/NACK/DTX) and the CQI. The encoding/modulating unit 61 performs an encoding/modulating processing operation on the control signal generated in the control signal generation unit 60.

The multiplexing unit 62 multiplexes the data signal and the control signal, which are subjected to the encoding/modulating processing operations, and the reference signal, and hence generates a baseband signal to be transmitted. After the transmitter 63 up-converts the baseband signal from the multiplexing unit 62 from a baseband frequency into a wireless frequency, the transmitter 63 transmits a signal that has the wireless frequency from the transmission antenna 64.

(2-2) Operation Performed in Buffer Control Unit

Figure 6:
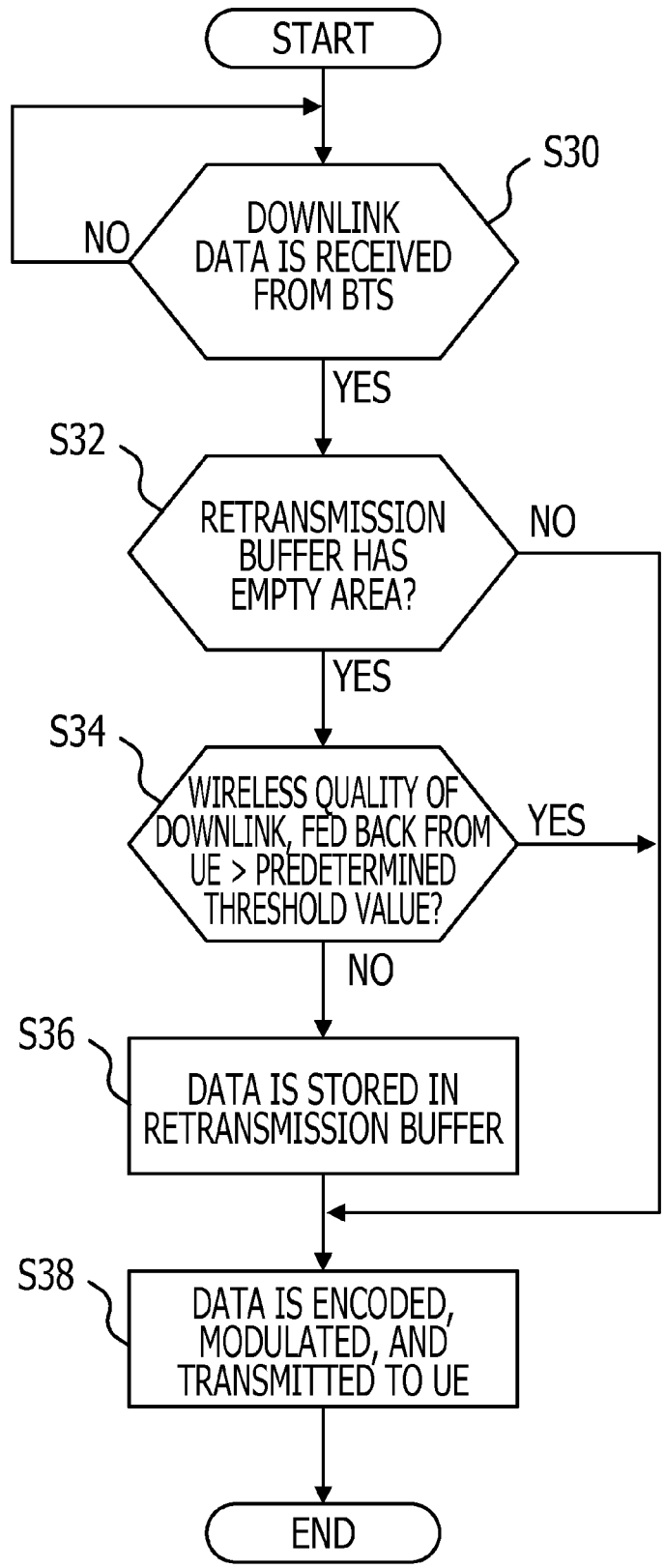
FIG. 6 is a flowchart illustrating an example of an operation performed in a buffer control unit in the second embodiment.

Next, an operation performed in the buffer control unit 27 in the relay station according to the embodiment will be described with reference to FIG. 6. FIG. 6 is a flowchart illustrating an example of the operation performed in the buffer control unit 27.

Before the operation illustrated in the flowchart in FIG. 6, the relay station receives the control signal, which includes the CQI that indicates the wireless quality of a downlink from the relay station to each mobile station, from each mobile station that is a relay destination, and stores a value of the CQI as reference information in the information storage unit 26. The control signal that includes the CQI corresponds to a feedback signal from each mobile station to the relay station. The control signal is to be demodulated and decoded by the demodulating/decoding unit 17, and is to be stored in the information storage unit 26.

In FIG. 6, first, a case in which the relay station has received downlink data transmitted from the base station to a specific mobile station is assumed (Step S30). The reception signal is converted into a baseband signal by the receiver 12, and is separated into a data signal, a control signal, and a reference signal by the de-multiplexing unit 13. The buffer control unit 27 determines whether or not a memory area necessary for storing the data signal and the control signal, which are demodulated and decoded by the demodulating/decoding units 16 and 17, respectively, remains in the retransmission buffer 18, namely, the retransmission buffer 18 has an empty area (Step S32). As a result, when the retransmission buffer 18 has no empty area (Step S32: NO), the buffer control unit 27 encodes, modulates, and transmits the data signal and the control signal (correspond to "data" in the flowchart in FIG. 6) to the mobile station without the data signal and the control signal being stored in the retransmission buffer 18 (Step S38).

In Step S32, when the retransmission buffer 18 has an empty area (Step S32: YES), the buffer control unit 27 proceeds to Step S34. In Step S34, by referring the information storage unit 26, the buffer control unit 27 refers to a CQI obtained based on a feedback signal from the mobile station that is a relay destination, and determines whether or not the wireless quality of a downlink from the relay station to the mobile station that is a relay destination is higher than a predetermined threshold value. As a result, when the wireless quality of the downlink to the mobile station is higher than the predetermined threshold value (Step S34: YES), the buffer control unit 27 determines that the chance of retransmitting is low, and does not store the data signal and the control signal (correspond to "data" in the flowchart in FIG. 6) in the retransmission buffer 18. In addition, the data signal and the control signal are individually encoded and modulated, and are transmitted to the mobile station (Step S38).

On the other hand, when the wireless quality of the downlink to the mobile station is not higher than the predetermined threshold value (Step S34: NO), the buffer control unit 27 determines that the chance of retransmitting is high, and stores the data signal and the control signal (correspond to "data" in the flowchart in FIG. 6) in the retransmission buffer 18 (Step S36). After that, the data signal and the control signal are individually encoded and modulated, and are transmitted to the mobile station (Step S38).

As described above, in the wireless relay system according to the embodiment, in the same way as the first embodiment, when the chance of retransmitting data is low, the data is stopped from being stored in the retransmission buffer in the relay station. Accordingly, when wireless communication is relayed from the base station (transmission device) to the mobile station (reception device), the capacity of the retransmission buffer may be reduced, the retransmission buffer being used in order for the relay station to temporarily store data that is a relay object so that the relay station retransmits the data. Accordingly, the whole relay station may be downsized, and an access time for the retransmission buffer becomes shortened, thereby contributing to the reduction of a time necessary for communication from the relay station to the mobile station (reception device).

(2-3) Modified Example of Operation Performed in Buffer Control Unit

A modified example of the relay station according to the embodiment will be described hereinafter.

First Modified Example

A first modified example is a case in which the reference information stored in the information storage unit 26 in the relay station is information that indicates the frequency of a retransmission request from each base station. For example, when the mobile station is located at a location, the wireless environment of which is not favorable, or located near a cell boundary, for a long time, it may be assumed that the frequency of a previous retransmission request is high and the chance of receiving a retransmission request with respect to new transmission is high. Namely, in a case in which data transmission is performed from the relay station to the mobile station, with respect to a mobile station (reception device) from which data retransmission requests were frequently performed for a predetermined number of times transmission was performed, it may be determined that the chance of performing data retransmission with respect to new data transmission is also high. From this standpoint, in the modified example, based on the retransmission control signal fed back from the mobile station with respect to a predetermined number of times transmission was performed for each mobile station, the relay station holds information as the reference information in the information storage unit 26, the information indicating the frequency for retransmission request. In addition, the buffer control unit 27 determines that the chance of performing retransmission with respect to new data becomes high with increase in the number of times retransmission requests are received for a predetermined number of times transmission is performed, namely, the number of times retransmission control signals that indicate a "NACK" or a "DTX" are received. In addition, in the modified example, the retransmission control signal corresponds to a feedback signal from the mobile station.

Figure 7:
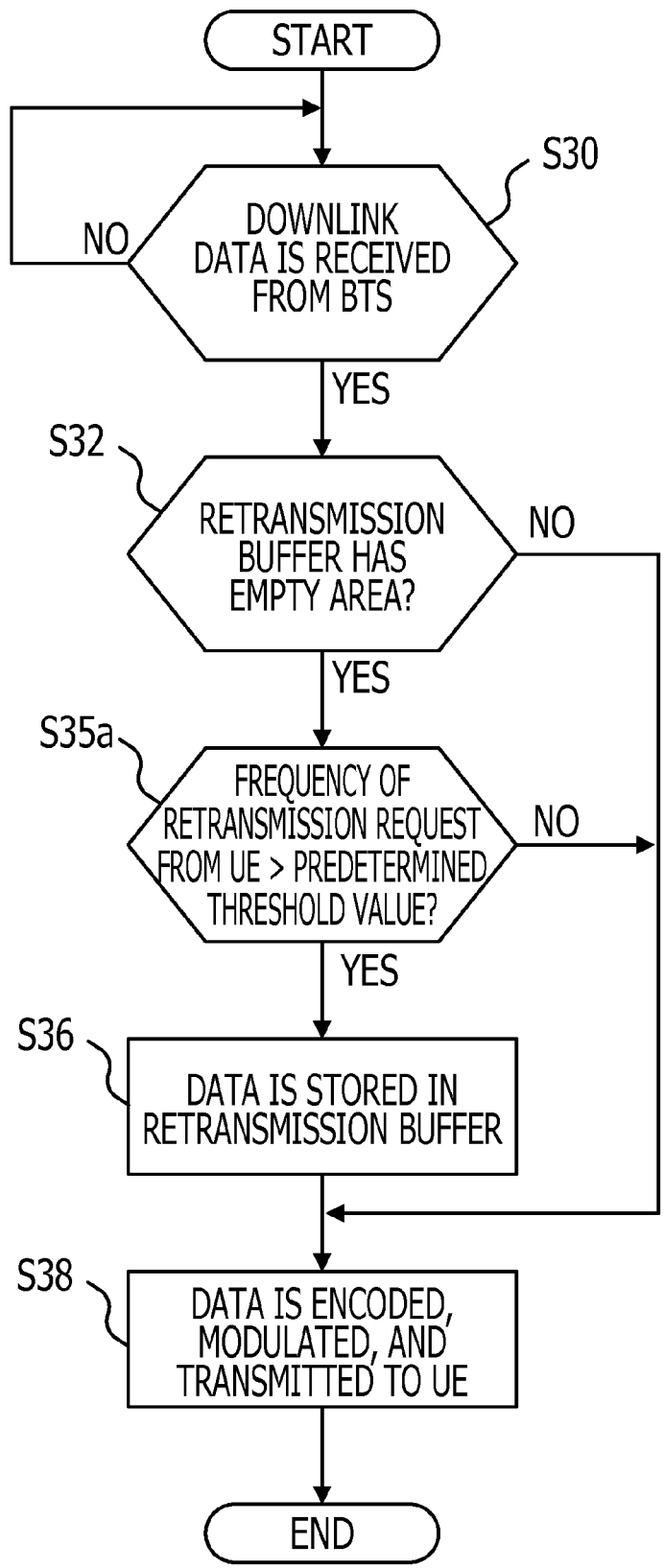
FIG. 7 is a flowchart illustrating an example of an operation performed in a buffer control unit in a modified example of the second embodiment.

A flowchart illustrating the modified example is indicated in FIG. 7. Compared with FIG. 6, FIG. 7 differs in that Step S35a is provided in place of Step S34. Namely, in FIG. 7, when the frequency of a retransmission request from the mobile station is higher than a predetermined threshold value, the buffer control unit 27 determines that the chance of performing retransmission with respect to new data is high, and stores the data signal and the control signal (correspond to "data" in the flowchart in FIG. 7) in the retransmission buffer 18.

Second Modified Example

A second modified example is a case in which the reference information stored in the information storage unit 26 in the relay station is information that indicates a distance between the relay device and each mobile station. For example, when the mobile station is located near a cell boundary, it may be assumed that the chance of receiving a retransmission request with respect to new transmission is high owing to propagation loss that is large compared with a case in which the mobile station is located near the relay station. Namely, in a case in which data transmission is performed from the relay station to the mobile station, with respect to a mobile station (reception device) located far from the relay station, it may be determined that the chance of performing retransmission with respect to new data transmission is high. From this standpoint, in the modified example, the relay station holds information as the reference information in the information storage unit 26, the information indicating a distance between the relay device and each mobile station. Some examples of a method for obtaining the reference information may be considered. For example, when the mobile station includes a global positioning system (GPS) function, the relay station acquires a signal as a feedback signal from the mobile station, the signal indicating coordinate information of each mobile station on the GPS, and, based on the coordinate information, may estimate the distance between the relay device and each mobile station. In addition, based on a time elapsing from data transmission to each mobile station to the reception of a retransmission control signal, the relay station may estimate the distance between the relay device and each mobile station. In addition, the buffer control unit 27 determines that the chance of performing retransmission with respect to new data becomes high with increase in distance between the relay device and each mobile station. In this case, the retransmission control signal corresponds to a feedback signal from the mobile station.

Figure 8:
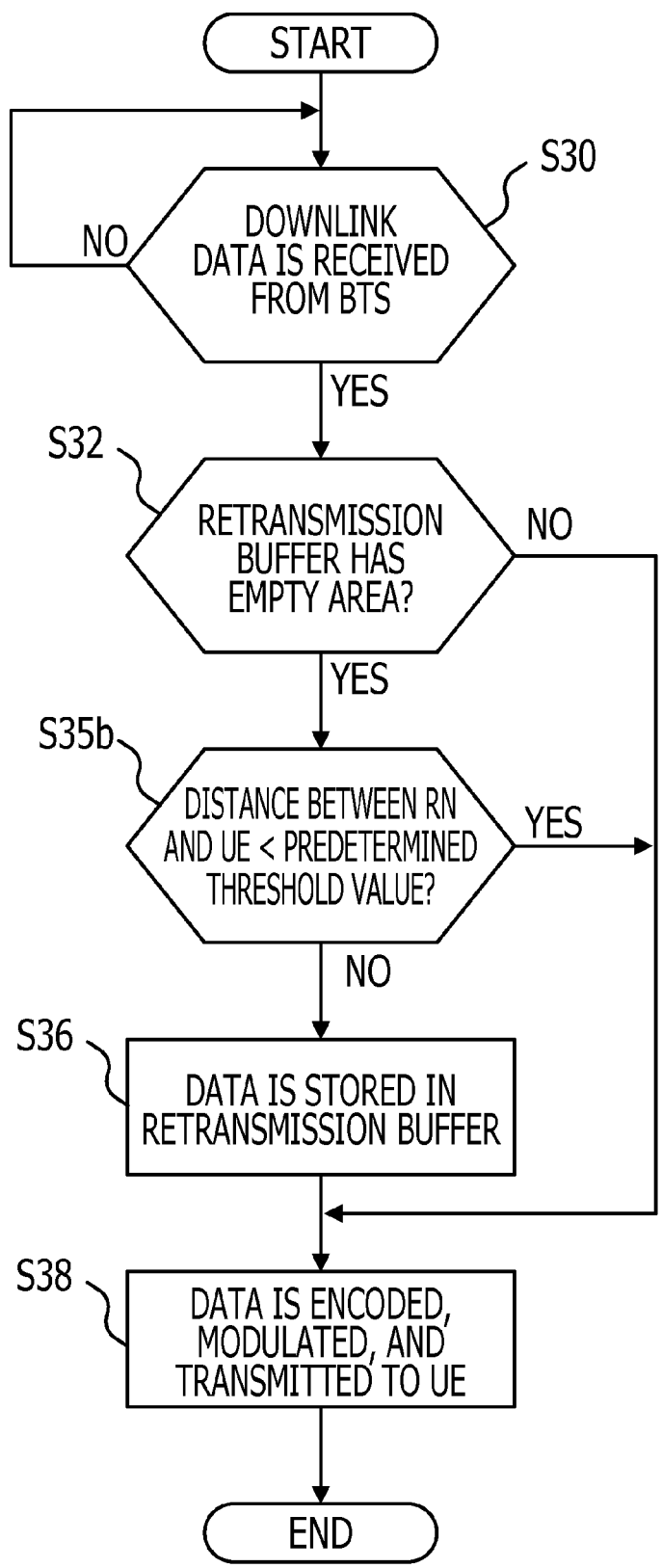
FIG. 8 is a flowchart illustrating an example of an operation performed in a buffer control unit in a modified example of the second embodiment.

A flowchart illustrating the modified example is indicated in FIG. 8. Compared with FIG. 6, FIG. 8 differs in that Step S35b is provided in place of Step S34. Namely, in FIG. 8, when the distance between the relay device and the mobile station is higher than a predetermined threshold value, the buffer control unit 27 determines that the chance of performing retransmission with respect to new data is high, and stores the data signal and the control signal (correspond to "data" in the flowchart in FIG. 8) in the retransmission buffer 18.

(3) Third Embodiment

A wireless relay system according to a third embodiment will be described, hereinafter. When the moving velocity of the mobile station is low, it may be assumed that a wireless environment does not change steadily. Therefore, the relay station may perform a buffer control operation based on the reference information previously obtained. On the other hand, when the moving velocity of the mobile station is high, there is a possibility that a wireless environment changes greatly. Therefore, it is preferred that the relay station performs the buffer control operation based on the updated reference information. From this standpoint, in the embodiment, the relay station varies the frequency of update of the reference information in accordance with the moving velocity of the mobile station.

(3-1) Configuration of Relay Station

First, a configuration of a relay station according to the embodiment will be described with reference to FIG. 9. In addition, in FIG. 9, the same symbol is assigned to the same portion as in the second embodiment illustrated in FIG. 4, and a redundant description thereof will be omitted hereinafter.

Figure 9:
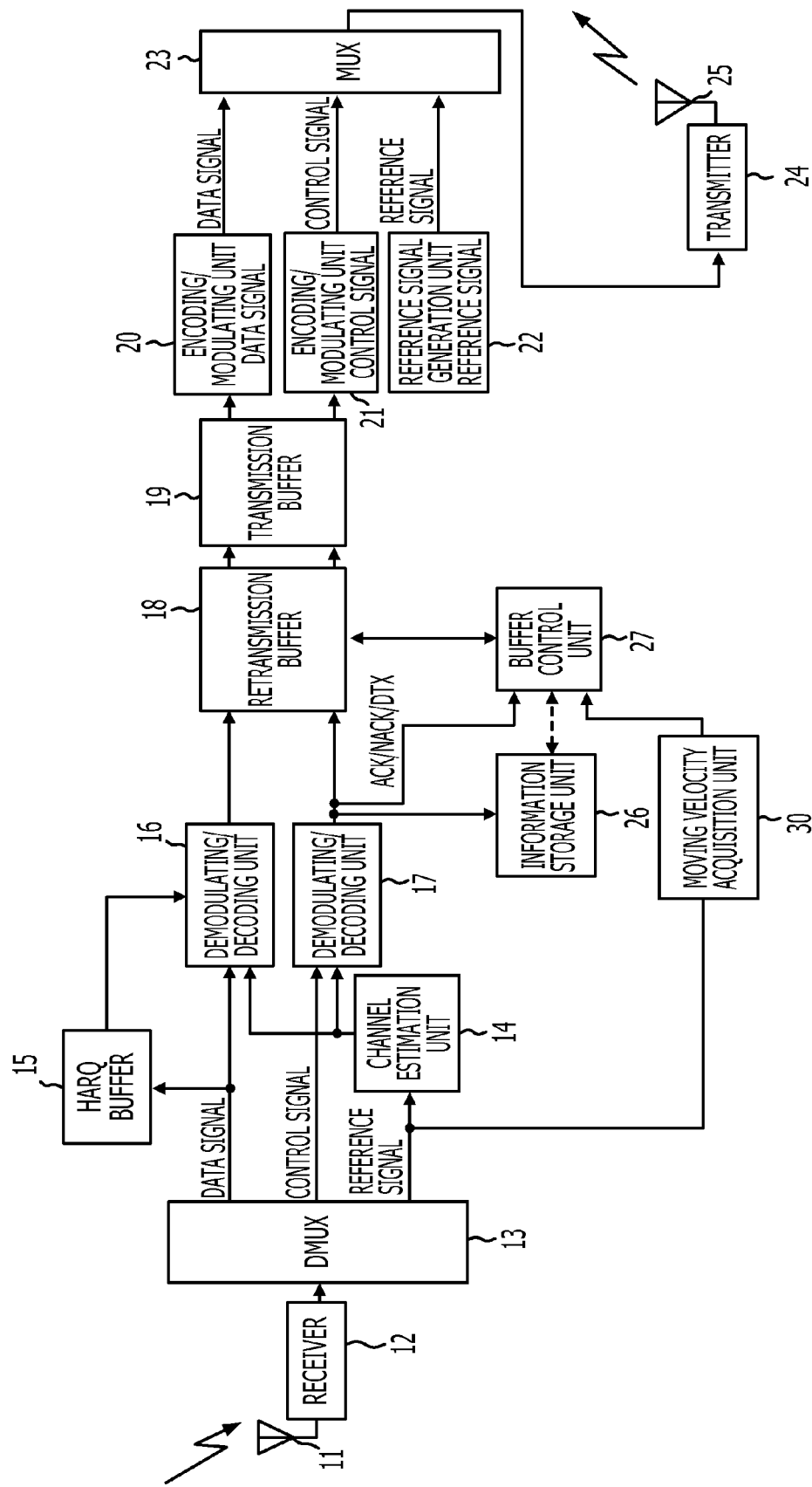
FIG. 9 is a block diagram illustrating an example of an internal configuration of a relay station (RN) in a third embodiment.

As illustrated in FIG. 9, in the relay station according to the embodiment, compared with FIG. 4, a moving velocity acquisition unit 30 is added. The moving velocity acquisition unit 30 extracts a known reference signal such as a pilot symbol, a preamble, or the like, obtained from the de-multiplexing unit 13, and estimates a moving velocity by measuring the interval (fading pitch) of a decline in the electric field intensity of the reference signal. In addition, as a specific method for moving velocity estimation, for example, a technique disclosed in Japanese Laid-open Patent Publication No. 10-79701 (corresponding to U.S. Pat. No. 6,335,923B2) may be adopted. In addition, when the mobile station detects the moving velocity of the mobile station itself, and adds the detected moving velocity to a control signal for an uplink, the moving velocity acquisition unit 30 extracts the moving velocity of each mobile station from the control signal.

The moving velocity acquisition unit 30 supplies the moving velocity of each mobile station to the buffer control unit 27 according to the embodiment, and the buffer control unit 27 updates the reference information when the moving velocity of the mobile station is high. On the other hand, when the moving velocity of the mobile station is low, the buffer control unit 27 uses previous reference information in place of the updated reference information without updating the reference information.

(3-2) Operation Performed in Buffer Control Unit

Figure 10:
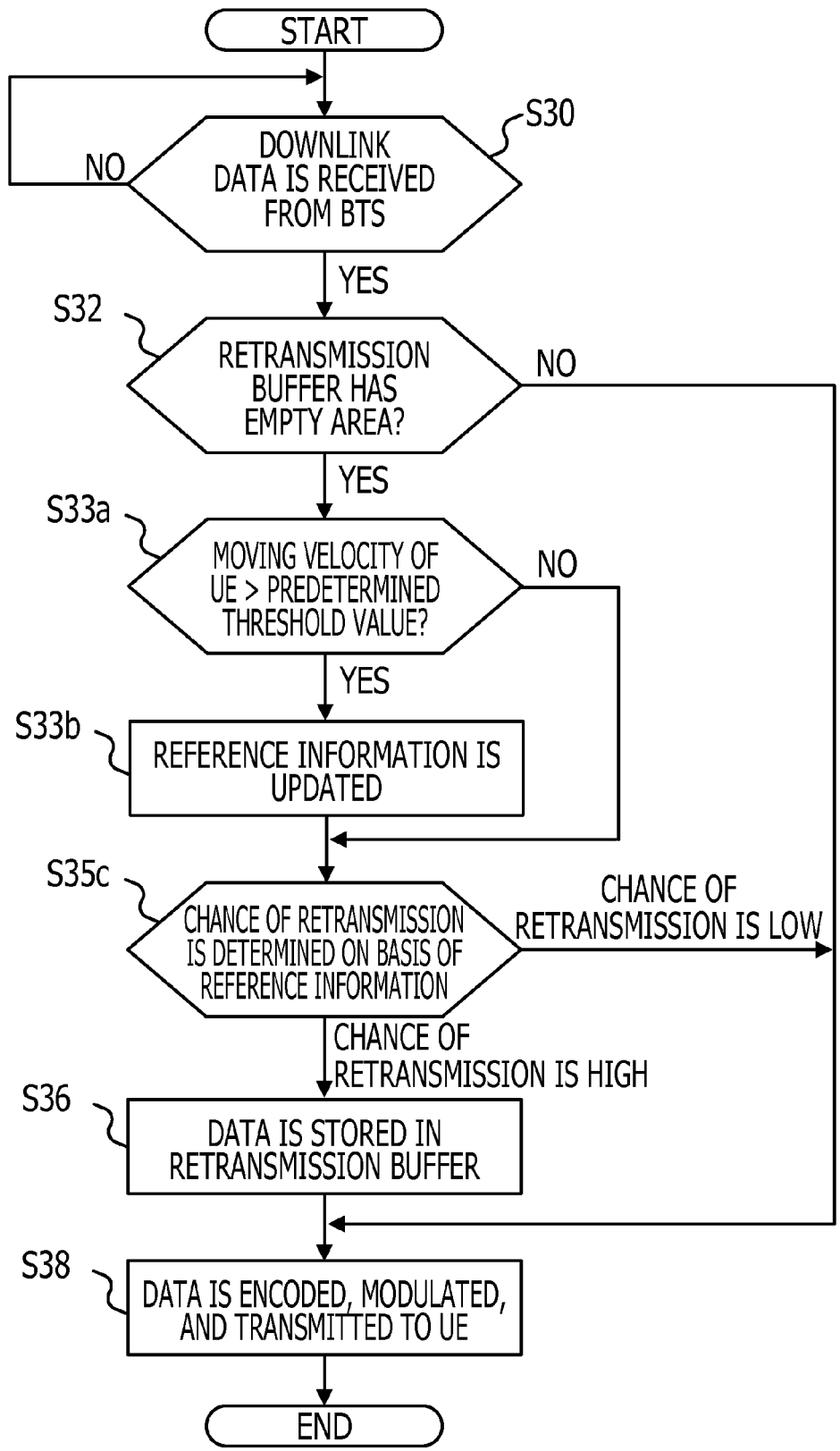
FIG. 10 is a flowchart illustrating an example of an operation performed in a buffer control unit in the third embodiment.

Next, an operation performed in the buffer control unit 27 in the relay station according to the embodiment will be described with reference to FIG. 10. FIG. 10 is a flowchart illustrating an example of the operation performed in the buffer control unit 27. In addition, in individual steps, the same symbol is assigned to the same step as in FIG. 6.

In FIG. 10, first, a case in which the relay station has received downlink data transmitted from the base station to a specific mobile station is assumed (Step S30). The reception signal is converted into a baseband signal by the receiver 12, and is separated into a data signal, a control signal, and a reference signal by the de-multiplexing unit 13. The buffer control unit 27 determines whether or not a memory area necessary for storing the data signal and the control signal, which are demodulated and decoded by the demodulating/decoding units 16 and 17, respectively, remains in the retransmission buffer 18, namely, the retransmission buffer 18 has an empty area (Step S32). As a result, when the retransmission buffer 18 has no empty area (Step S32: NO), the buffer control unit 27 encodes, modulates, and transmits the data signal and the control signal (correspond to "data" in the flowchart in FIG. 10) to the mobile station without the data signal and the control signal being stored in the retransmission buffer 18 (Step S38).

In Step S32, when the retransmission buffer 18 has an empty area (Step S32: YES), the buffer control unit 27 proceeds to Step S33a. In Step S33a, the buffer control unit 27 refers the moving velocity acquisition unit 30, and determines whether or not the moving velocity of the mobile station that is a relay destination is higher than a predetermined threshold value. In addition, when the moving velocity of the mobile station is higher than the predetermined threshold value (Step S33a: YES), there is a possibility that a wireless environment changes greatly. Therefore, the reference information stored in the information storage unit 26 is updated with the latest reference information (Step S33b). When the moving velocity of the mobile station is not higher than the predetermined threshold value (Step S33a: NO), it may be assumed that the wireless environment does not change steadily. Therefore, the reference information stored in the information storage unit 26 is not updated.

Next, in Step S35c, the buffer control unit 27 determines the chance of retransmission based on the reference information stored in the information storage unit 26. The operation performed in Step S35c corresponds to operations performed in Steps S34, S35a, and S35b in FIGS. 6 to 8. When, in Step S35c, it is determined that the chance of retransmission is low, the data signal and the control signal (correspond to "data" in the flowchart in FIG. 10) are not stored in the retransmission buffer 18. After that, the data signal and the control signal are individually encoded and modulated, and are transmitted to the mobile station (Step S38).

On the other hand, when, in Step S35c, it is determined that the chance of retransmission is high, the data signal and the control signal (correspond to "data" in the flowchart in FIG. 10) are stored in the retransmission buffer 18 (Step S36). After that, the data signal and the control signal are individually encoded and modulated, and are transmitted to the mobile station (Step S38).

As described above, in the wireless relay system according to the embodiment, the relay station varies the frequency of update of the reference information from the mobile station in accordance with the moving velocity of the mobile station. Accordingly, a time for updating the reference information based on which the relay station determines the chance of retransmission becomes suitable.

In addition, for example, in the individual embodiments described above, a case in which wireless communication in a downlink from the base station (transmission device) to the mobile station (reception device) is relayed is described as an example. However, the present invention is not limited to the example. The present invention may be applied to a case in which wireless communication in an uplink from the mobile station (transmission device) to the base station (reception device) is relayed. In addition, the present invention may be applied to a case in which wireless communication between communication devices, which is not performed via the base station, is relayed. As an example of such a wireless communication, ad hoc communication or multihop communication may be cited.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that various changes, substitutions, and alterations could be made hereto without departing from the spirit and scope of the invention.

The invention claimed is:

1. A relay device for relaying wireless communication between a transmission device and a reception device, comprising:
   a buffer configured to temporarily store first data that is a relay object so that the first data is retransmitted to the reception device;
   a buffer control unit configured to restrict the first data from being stored in the buffer when, based on information acquired using a signal fed back from the reception device, it is determined that a chance of retransmitting the first data is low; and
   a transmitter configured to request the transmission device to retransmit the first data when the first data is not stored in the buffer and the first data is to be retransmitted to the reception device.

2. The relay device according to claim 1, wherein
   the information is one of information that indicates wireless quality between the relay device and the reception device, information that indicates a frequency of a retransmission request, and information that indicates a distance between the relay device and the reception device.

3. The relay device according to claim 1, wherein
   the buffer control unit increases a frequency of update of the information with increase in moving velocity of the reception device.

4. A wireless relay method performed in a relay device for relaying wireless communication between a transmission device and a reception device, the wireless relay method comprising:
   referring, by the relay device, to information acquired using a signal fed back from the reception device and determining a chance of retransmitting the first data, before first data that is a relay object is transmitted;
   transmitting, by the relay device, the first data without storing the first data, when it is determined that a chance of retransmitting the first data is low; and
   requesting, by the relay device, the transmission device to retransmit the first data when the first data is not stored and the first data is to be retransmitted to the reception device.

5. The wireless relay method according to claim 4, further comprising:
   acquiring, by the relay device, a moving velocity of the reception device; and
   increasing, by the relay device, a frequency of update of the information in determining the chance of retransmitting the first data when the moving velocity is high with reference to a predetermined threshold value.

* * * * *